United States Patent

[11] 3,623,496

[72] Inventor Minoru Kawabata
 Chita, Japan
[21] Appl. No. 12,929
[22] Filed Feb. 20, 1970
[45] Patented Nov. 30, 1971
[73] Assignee Toyoda Koki Kabushiki Kaisha
 Asahi-machi, Kariya-shi, Aichi-ken, Japan
[32] Priority Feb. 28, 1969
[33] Japan
[31] 44/15738

[54] FLUID AMPLIFIER WITH SATURATION CHARACTERISTIC
 6 Claims, 3 Drawing Figs.
[52] U.S. Cl. ................................................. 137/81.5
[51] Int. Cl. .................................................. F15c 1/14, F15c 1/16
[50] Field of Search ..................................... 137/81.5
[56] References Cited
 UNITED STATES PATENTS
3,513,867 5/1970 Manion ..................... 137/81.5
3,233,622 2/1966 Boothe ...................... 137/81.5
3,331,382 7/1967 Horton ...................... 137/81.5
3,452,772 7/1969 Zaloudek ................... 137/81.5

*Primary Examiner*—William R. Cline
*Attorney*—Berman, Davidson and Berman

ABSTRACT: A fluid amplifier with a saturation characteristic, the amplifier consisting of a main fluid inlet conduit supplied with a fluid to be controlled, a plurality of fluid flow outlet conduits disposed downstream of the main fluid inlet conduit at a predetermined distance to receive the controlled flow from the main inlet conduit, a vortex chamber between the main fluid inlet conduit and the fluid flow outlet conduit for producing vortex flow, control fluid inlet nozzles directed into said vortex chamber in the same direction as the vortex flow and supplied with control flow fluid for acting on the vortex flow to control the deflection of the fluid from the main fluid inlet conduit, and airfoillike elements positioned within the vortex chamber in alignment with the fluid flow from the main inlet conduit for limiting the deflection of the fluid flow from the main fluid inlet conduit to maintain a saturated condition of deflected main fluid flow.

INVENTOR
MINORU KAWABATA,
BY
Berman, Davidson & Berman,
ATTORNEYS.

3,623,496

FLUID AMPLIFIER WITH SATURATION CHARACTERISTIC

BACKGROUND OF THE INVENTION

This invention relates to fluid amplifiers, and more particularly to a proportional fluid amplifier with a saturation characteristic in which output pressure is maintained constant regardless of excessive control input.

In conventional proportional fluid amplifiers, control nozzles are provided at substantially right angles to a main nozzle for deflecting the main flow therefrom. Control input from the control nozzle impinges at right angles on the main flow. Thus the main flow is deflected depending upon the momentum of the main fluid flow and the control input.

The momentum of the main fluid flow is usually constant, and thus the main fluid flow is deflected in accordance with the momentum of the control input. When opposite control inputs are simultaneously applied to the main fluid flow, the deflection of the main fluid flow varies in accordance with the momentum differential between the momentums of the opposite control inputs. Since the momentum of the control input is generally small as compared to that of the main fluid flow, the device may be used as an amplifier which obtains a relatively large gain.

In the usual fluid amplifier, a large space or interaction chamber is provided between a main nozzle and the associated receiving ports and the chamber is vented to the atmosphere so as to avoid a wall-attachment effect. The distance between the main nozzle and the receiving ports has a great influence on the efficiency of the device. In accordance with increase in this distance, both output pressure and gain are decreased. However, the large space or interaction chamber is essential in order to prevent the wall-attachment effect. Thus, the efficiency is relatively low in the conventional proportional fluid amplifier. Furthermore, when large momentum of control input is applied to the main fluid flow, that main fluid flow is deflected into the vent port and is vented to the atmosphere, whereby output pressure at the associated receiving port is considerably decreased. A device for avoiding the excessive control input is, therefore, required in the conventional fluid amplifier.

SUMMARY OF THE INVENTION

It is, therefore, an object of the invention to provide a novel and useful fluid amplifier.

It is another object of the invention to provide a proportional fluid amplifier wherein the deflection of main fluid flow from the main fluid inlet means is limited by providing airfoillike means in alignment with the main fluid flow within vortex means between the main fluid inlet means and the associated fluid flow outlet means.

It is another object of the invention to provide a proportional fluid amplifier having a saturation characteristic such that output pressure in the fluid flow outlet means is kept constant regardless of excessive control input.

It is a further object of the invention to provide a proportional fluid amplifier wherein a small control input may deflect a large amount of main fluid flow.

BRIEF DESCRIPTION OF THE DRAWINGS

The foregoing and other objects of the present invention will become fully apparent from the following description of a preferred embodiment of the present invention, with reference to the accompanying drawings, in which.

DESCRIPTION OF THE INVENTION

Figure 1:
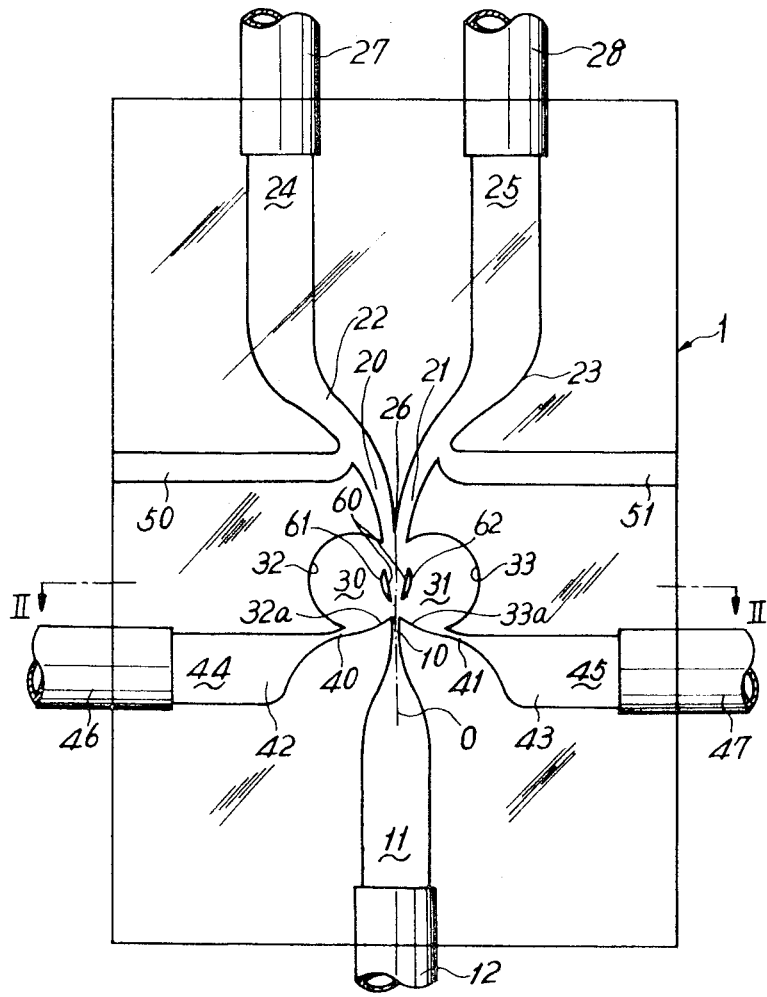
FIG. 1 is a plan view showing a fluid amplifier with a saturation characteristic constructed in accordance with the present invention.
Figure 2:
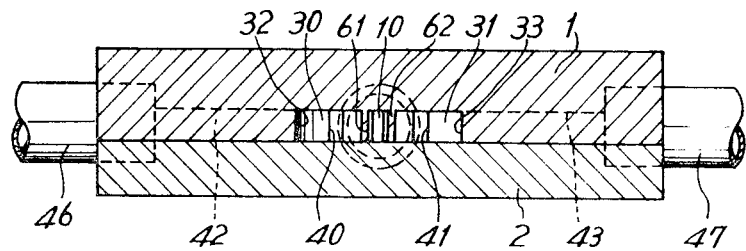
FIG. 2 is a sectional view taken along the line II—II of FIG. 1.

Referring now to FIGS. 1 and 2, a flat plate 1 is recessed to define the configuration of a fluid amplifier according to the present invention, and is fluid-tightly fixed to a flat plate 2. It will be apparent that the particular means by which the plates are secured together is not critical, so long as the connection is sufficiently tight to insure that no fluid can leak from the fluid amplifier. Plates 1 and 2 may be made of metal, plastic or ceramic, or any other suitable materials, and for the purpose of illustration, these plates are illustrated herein as being composed of a clear plastic.

A main supply nozzle 10, the end opening of which is constricted, is connected to a supply passage 11. A pair of receiving ports 20 and 21, separated by a splitter 25, are disposed at a predetermined distance from the main supply nozzle 10 and are supplied with fluid discharged from the main nozzle 10. The receiving ports 20 and 21 are respectively connected to output ports 24 and 25 through gradually diverging passages 22 and 23.

Between the main nozzle 10 and the receiving ports 20, 21 are formed a pair of substantially circular and overlapping vortex chambers 30 and 31 which are symmetrical with respect to the centerline 0 passing through the main nozzle 10. Circular walls 32 and 33 of the vortex chambers 30 and 31 terminate at the end openings of the main nozzle 10 and the receiving ports 20 and 21. A pair of control nozzles 40 and 41, which are adjacent to the main nozzle and opposite to each other, extend tangentially into the vortex chambers 30 and 31, with relatively small arcuate walls 32a and 33a left between the main nozzle 10 and the control nozzles 40 and 41. The control nozzles 40 and 41 are respectively connected to control pipes 46 and 47 through control ports 44 and 45, and control passages 42 and 43 to be supplied with control inputs. A pair of vent passages 50 and 51 extend through sidewalls of the passages 22 and 23, being directed downstream at their connections to said sidewalls, and are vented to atmosphere. These connections of the vent passages to passages 22 and 23 prevent fluid passing through the passages 22 and 23 toward the output ports 24 and 25 from passing through the vent passages and permits return fluid flow from the output ports 24 and 25 toward the receiving ports 20 and 21 caused by excessive loading to pass through the vent passages. A pair of airfoillike members 61 and 62 are positioned within the vortex chambers in alignment with fluid flow from the main nozzle 10 for limiting the deflection of the fluid flow from the main nozzle to maintain a saturated condition of the deflected fluid flow. Fluid under pressure, such as air from a supply source (not shown), is supplied into the main nozzle 10 through a supply pipe 12 and the supply passage 11. Pressure fluids passing through the receiving ports 20 and 21 may be respectively fed to any other device to be operated from the output passages 22, 23, output ports 24, 25 and output pipes 27, 28.

In operation, when main pressure fluid, such as air, is injected into the main nozzle 10 and passes into the vortex chambers with no control input applied, it follows along the inner surfaces 60 of the airfoillike members and divides equally between the receiving ports 20 and 21. A part of the main fluid follows along the walls 32 and 33 to produce equal vortex flows in the vortex chambers 30 and 31. The outer surfaces of the airfoillike members 61 and 62 prevent vortex flows in the vortex chambers 30 and 31 from directly impinging on the main fluid. The predetermined distance between the main nozzle 10 and the airfoillike members 61 and 62 permits the main flow to entrain a part of the vortex flows and, therefore, arrests any wall-attachment effect which may otherwise tend to occur at the inner surfaces 60 of the airfoillike members.

When control input is tangentially introduced into one of the vortex chambers, say into the left chamber 30 through the control nozzle 40, the pressure in the lower portion of the vortex chamber 30 is raised, whereby to shift the center of the vortex flow therein upwardly, thereby to deflect the main fluid to the right. Thus, fluid flow into the receiving port 20 is decreased, but fluid flow into the receiving port 21 is increased, in proportion to the strength of the control input acting at the control nozzle 40. Since the control nozzle 40 extends tangentially into the vortex chamber 30, and further control flow is introduced into the vortex chamber 30 in the same direction as the vortex flow, a slight control flow in the control nozzle 40 can divert a much larger main fluid flow. Thus, a large gain of output pressure versus control pressure may be obtained. Even if excessive control input is supplied to the vortex chamber 30 through the control nozzle 40, the deflection of the main jet is limited by the airfoillike member 61, and is further limited by the pressure in the vortex chamber 31, increased in response to the deflection of the main fluid to the right. Thus, the main fluid is not deflected beyond the area of the receiving port 21 and, therefore, the output pressure in the receiving port 21 is not decreased with excessive control input in the control nozzle 40, while the output pressure in the conventional device is considerably decreased in response to excessive control input. When opposite control inputs are simultaneously applied in the vortex chambers 30 and 31 through control nozzles 40 and 41, respectively, the deflection of the main fluid flow varies in response to the pressure differential developed in the vortex chambers 30 and 31.

Figure 3:
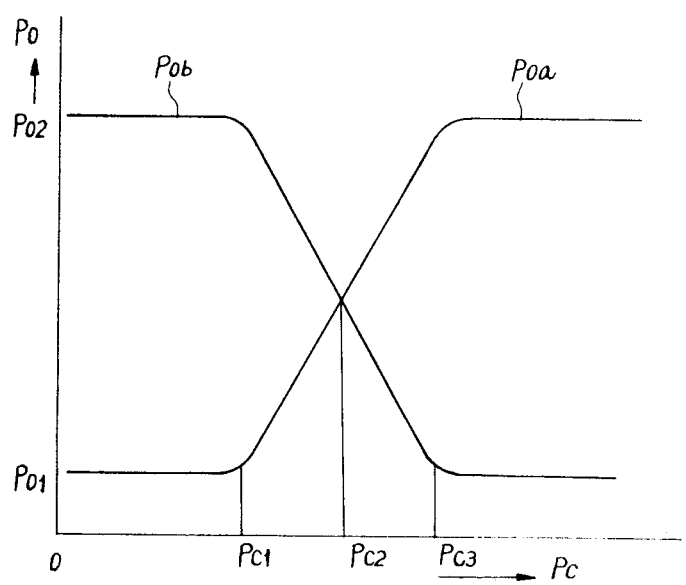
FIG. 3 is a diagram showing output pressures as a function of control pressure.

Referring to FIG. 3, which shows the operating characteristic of the output pressure $P_0$ in each of output ports 24 and 25 as a function of control pressure $P_c$ in the control nozzle 40, with the control nozzle 41 subjected to a predetermined biasing pressure, and thus with the main fluid flow initially deflected to the extreme left, a line $P_{0a}$ shows the output pressure in the right output port 25 and a line $P_{0b}$ shows the output pressure in the left output port 24. When the control pressure $P_c$ in the control nozzle is zero, the output pressure $P_{0a}$ in the output port 25 has a value $P_{01}$, and the output pressure $P_{0b}$ in the output port 24 has a value $P_{02}$. The output pressures in both output ports 24 and 25 are maintained constant, until the control pressure $P_c$ becomes $P_{c1}$. When the control pressure becomes $P_{c1}$, the main fluid flow begins to be deflected to the right. Thus, the output pressure $P_{0b}$ gradually decreases and the output pressure $P_{0a}$ gradually increases in response to increase in the control pressure $P_c$. When the control pressure $P_c$ becomes $P_{c2}$, which is equal to the biasing pressure in the control nozzle 41, both output pressures $P_{0a}$ and $P_{0b}$ become equal. When the control pressure $P_c$ becomes $P_{c3}$, the main fluid flow is deflected to the extreme right and thus the output pressure $P_{0a}$ becomes $P_{02}$ and $P_{0b}$ becomes $P_{01}$. Even when the control pressure $P_c$ further increases, both output pressures are maintained constant.

As will be understood from the above description, the output pressure is not decreased in response to excessive control pressure.

While the invention has been described by means of a specific embodiment, it should be understood that the novel characteristics of the invention may be incorporated in other structural forms without departing from the spirit and scope of the invention as defined in the following claims.

I claim:

1. A fluid amplifier comprising main fluid inlet means supplied with a fluid to be controlled, fluid flow outlet means disposed downstream of said main fluid inlet means at a predetermined distance therefrom to receive the controlled flow from said main fluid inlet means, enclosed vortex means between said main fluid inlet means and fluid flow outlet means for producing vortex flow, vent means spaced from the vortex means and extending into said outlet means, controlled fluid inlet means extending into said vortex means in the same direction as said vortex flow produced in said vortex means and supplied with controlled fluid acting on said vortex flow to control the deflection of the fluid flow from the main fluid inlet means, and airfoillike means positioned within said vortex means in alignment with the fluid flow from the main fluid inlet means for limiting the deflection of the fluid flow from said main fluid inlet means, whereby to maintain a saturated condition of deflection in the deflected main fluid flow.

2. A fluid amplifier comprising a main fluid inlet supplied with a fluid to be controlled, a pair of fluid flow outlets disposed downstream of said main fluid inlet at a predetermined distance to receive the controlled flow from said main fluid inlet, a pair of enclosed vortex chambers between said main fluid inlet and the fluid flow outlets arranged symmetrically with respect to the centerline passing though said main fluid inlet for producing a vortex flow in each of said vortex chambers, means defining a pair of vent passages spaced from the vortex chambers and extending into said respective outlets, a pair of control inlets extending respectively into said pair of vortex chambers in the same direction as said vortex flow produced in each of said vortex chambers and supplied respectively with control fluid acting on the vortex flows to control the deflection of the fluid flow from the main fluid inlet, and a pair of airfoillike members symmetrically positioned within said vortex chambers in alignment with said fluid flow from said main fluid inlet for limiting the deflection of the fluid flow from said main fluid inlet, whereby to maintain a saturated condition of deflection in the deflected main fluid flow.

3. A fluid amplifier as claimed in claim 2, wherein said pair of vortex chambers are substantially circular, respectively, and overlap.

4. A fluid amplifier as claimed in claim 2, wherein said pair of control inlets extend tangentially into said pair of vortex chambers, respectively.

5. A fluid amplifier as claimed in claim 4, wherein said pair of control inlets are adjacent to the main inlet and opposite to each other.

6. A fluid amplifier as claimed in claim 2, wherein said pair of vortex chambers are substantially circular, respectively, and overlap, and said pair of control inlets extend tangentially into said pair of vortex chambers, respectively, and are adjacent to the main inlet and opposite to each other.

* * * * *